Patented May 6, 1924.

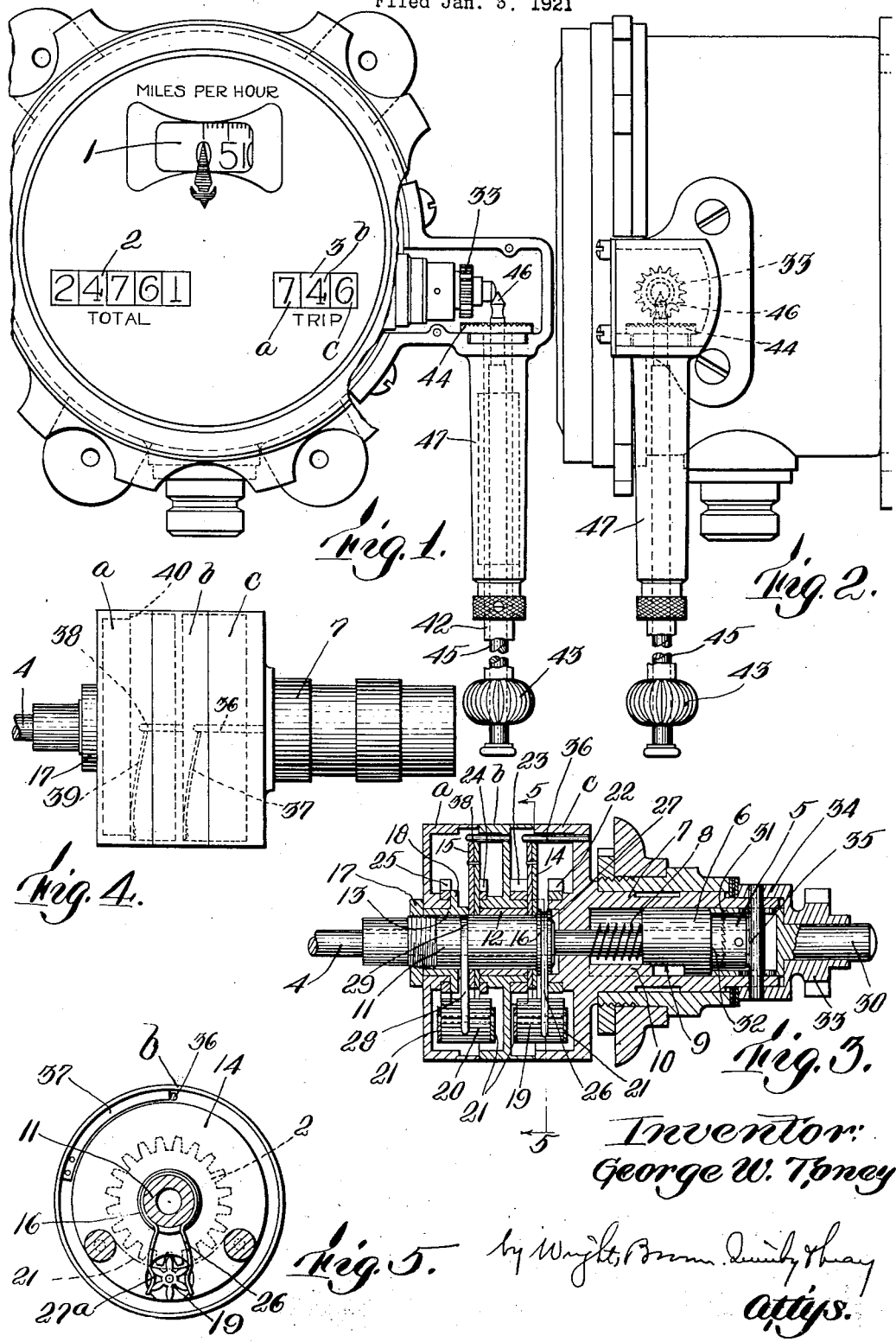

1,493,087

UNITED STATES PATENT OFFICE.

GEORGE W. TONEY, OF WALTHAM, MASSACHUSETTS, ASSIGNOR, BY MESNE ASSIGNMENTS, TO OLD COLONY TRUST COMPANY, TRUSTEE, A CORPORATION OF MASSACHUSETTS.

RESETTING DEVICE FOR ODOMETERS.

Application filed January 3, 1921. Serial No. 434,749.

*To all whom it may concern:*

Be it known that I, GEORGE W. TONEY, a citizen of the United States, residing at Waltham, in the county of Middlesex and State of Massachusetts, have invented new and useful Improvements in Resetting Devices for Odometers, of which the following is a specification.

This invention relates to odometer instruments of the type having trip counters which are adapted to be reset to zero position from time to time. By "trip counters" in this specification I mean a series of indicators which are driven by the odometer mechanism to show the distance traveled by the vehicle in which the odometer is mounted, and are capable of being disconnected from the driving mechanism and reset manually to zero position.

Odometers used for automobiles commonly have two series of counters, one of which contains a relatively large number of counters which are not capable of being reset and are used to show the total mileage of the car, and the other of which consists of a smaller number of counters for indicating the distance traveled from successive starting points. The latter indicator is what is known as the "trip indicator;" and usually shows miles and tenths of miles up to one hundred miles. The counters most commonly used in such odometers are cylindrical disks mounted in line upon a shaft which drives the disk of lowest order, and carrying numbers on their outer surfaces, which numbers are seen singly as to each disk through a sight opening in the dial of the instrument. It is with an instrument of the class referred to that this invention is concerned; and the object of the invention is to provide a means whereby the trip indicating counters of such instrument may be reset to the zero position more rapidly than is possible with the odometers now most generally used.

In the drawings herewith furnished I have shown the preferred embodiment of this invention and in said drawings Figure 1 is a face view of a complete odometer instrument showing the invention, part of the casing thereof being represented as broken away to show the interior parts. Figure 2 is an elevation of the instrument as seen from the right of Figure 1. Figure 3 is a longitudinal section of the trip odometer counters and the mechanism for resetting them. Figure 4 is an elevation of the trip counters removed from the instrument. Figure 5 is a section taken on line 5—5 of Figure 3.

Like reference characters indicate the same parts in all of the figures.

The instrument here shown for illustration combines the functions of an odometer and a speedometer and for that purpose has a speed indicator 1 and two distance indicators 2 and 3. Of these distance indicators that designated as 2 is the one which registers the total distance traveled and therewith the present invention has no concern. That designated as 3 is the trip indicator, and in the embodiment shown consists of three counting disks $a$, $b$ and $c$ which show, respectively, tens, units and tenths of miles, and may show corresponding values in terms of other standards of distance, or other fractions of the unit.

Referring now to Figure 3 the numeral 4 designates the odometer driving shaft which drives the tenths indicating counter $c$, (the counter of lowest value) through a clutch head 5 on the shaft and a complemental clutch sleeve 6 arranged to slide freely endwise on said shaft and inside of the tubular hub or sleeve extension 7 of the counter. The head 5 and sleeve 6 have complemental ratchet teeth on abutting faces which are arranged to engage positively when the shaft rotates in a direction of forward propulsion; and the sleeve is yieldingly pressed toward the head by a spring 8. It may be displaced from the head by pressure exerted against it in opposition to the spring through mechanism later described. It transmits rotation to the counter $c$ through a flattened surface 9 which bears on an interior complemental part 10 in the sleeve 7.

The other two counting disks are rotatable on a sleeve 11 which surrounds the driving shaft 4, but is so held by the supporting frame of the instrument that it cannot rotate. Along this sleeve are fitted short sleeves or bushings 12 and 13, which provide bearings for the respective counters, and the disks or holders 14 and 15 for mounting the carrying pinions presently to be described. On one end of the sleeve 11 is a flange or shoulder 16 against which the disk 14 abuts, and on the other end is a nut 17 which abuts against the seating sleeve 13 and holds the series of disks 14, 15 and seating sleeves 12, 13 against said flange 16 and against one another, besides holding the counter *a* against endwise movement in one direction. A flange 18 on the seating sleeve 13 holds said counter against movement in the opposite direction. The intermediate counter *b* is prevented from moving in either direction by the disks 14 and 15 between which its hub is confined.

The disks 14 and 15 are double, each consisting of two plates abutted together, and these disks support the carrying pinions 19 and 20. Said plates are cut away in the part where the carrying pinions are located and each plate supports by posts 20ª (Figure 5) a bridge 21 spanning the cut away part, the bridges of the same disk being spaced apart from one another widely enough to receive one of the pinions between them and having bearings for the trunnions of such pinions.

The inner hub of the lowest order counter *c* carries two teeth 22 in position to mesh with carrying pinion 19 upon each revolution; and the intermediate counter carries on its right hand hub a continuous series of teeth 23 in mesh with carrying pinion 19 and having the size and spacing necessary to cause a partial rotation of one-tenth of a turn when the teeth 22 of the right hand counter pass the carrying pinion. A similar carrying mechanism between the middle counter and the left hand counter is provided by two teeth 24 on the left hand hub of the middle counter, by the intermediate pinion 20, and by a continuous series of teeth 25 on the hub of the left hand counter, all constructed and arranged to cause rotation of the left hand counter through one-tenth of a turn whenever the teeth 24 of the middle counter pass the carrying pinion 20.

The carrying pinions are restrained from rotation by spring pawls; that for the pinion 19 being shown at 26 and consisting of a bowed spring which embraces the sleeve 11 between the flange 16 and a complemental flange 27 thereon, and has legs which straddle the carrying pinion and are indented or offset at 27ª to engage the teeth of said pinion, as shown in Figure 5. A similar pawl 28 engages carrying pinion 20 and is seated in a groove 29 encircling sleeve 11, its legs passing through notches in the bearing sleeve 13. These holding pawls exert sufficient resistance against rotation of the carrying pinions to prevent accidental displacement of the counting disks by the jolts and shaking given to the instrument by the vehicle body in which it is mounted, but yield readily enough to permit the necessary movement of the counters for tallying distance and in being reset.

When it becomes necessary to reset the odometer the clutch sleeve 6 is disconnected from the clutch head 5 and then the right hand counter is turned backward. For thus disconnecting the clutch there is provided a shaft 30 having its inner end enlarged and recessed to form a shell 31 which passes over the head 5 and bears against a shoulder 32 on the clutch sleeve.

For rotating the right hand counter, in resetting there is provided a gear 33 which fits loosely upon the shaft 30 and has a sleeve portion 34 surrounding the end of the counter sleeve 7 and made fast thereto by a pin 35. The shell 31 is slotted where the pin 35 passes through it, whereby its movement endwise in the manner above described is permitted.

When the clutch is thus disconnected the counter *c* may be freely rotated oppositely to the direction of counting rotation. Then a pin 36, projecting laterally from the counter *c* comes to bear against one end of a spring pawl 37 (Figures 4 and 5) which is mounted at its opposite end on the central web of the counter *b*. Said pin and spring pawl are included within the adjacent rims of the counters and are, therefore, concealed from view. Also they are located further from the axis of the counters than the carrying pinion 19, wherefore they can pass such pinion without interference. The spring pawl is flexible and readily yielding, whereby it permits the pin 36 to pass it readily when carried with the counter in the normal direction, and after each traverse of the pin it springs back in rear thereof ready to be engaged upon its end when the pin is turned backward. A similar pin 38 projects laterally from the counter *b* to cooperate in the manner just described with a spring pawl 39 secured against a shoulder 40 inside the rim of counter *a*.

By this means the entire series of disks may be reset to zero position with no more than three complete rotations of the counter *a* and ordinarily with less than that number of rotations, for at some point during the first backward rotation of the right hand counter, its pin 36 is certain to engage the pawl 37, and at some time during the first ensuing rotation of the counter *b*, its pin is certain to engage the pawl 39 of the left hand counter. Thereafter in any case less than one complete rotation is necessary to bring the zero point of the left hand counter to the sight opening. Of course it is understood that the pins and pawls are placed so as to come into engagement when the same numbers on the adjacent counters are alined together.

The odometer may also be reset by turning the counter *c* forwardly with or without disconnecting the clutch part 6 from the clutch part 5; but in that case the resetting is slow, requiring ten turns of each right hand counter to rotate the next counter once. However, the ability to do this is of value, as it enables the trip counter to be set so as to show any desired distance indication.

Figures 1 and 2 show one form of means adapted to be manipulated for resetting the trip counter. This comprises an outer tubular shaft 42 provided with a crown 43 on its outer end and a crown gear 44 on its inner end adapted to be put into mesh with the pinion 33 by endwise movement; and an inner shaft 45 having a cone 46 on its end adapted to bear on the stem 30 so as to crowd the same into the position for uncoupling the clutch. The outer shaft has its bearing in a sleeve 47 fastened to the casing of the instrument and the inner shaft has a bearing in the outer shaft. Each is movable endwise and rotatable independently of the other. This particular operating means is here shown and described as illustrative of means operative for the purpose, but the invention which I desire to protect hereby is not restricted to the combination with this particular means.

What I claim and desire to secure by Letters Patent is:

1. In an odometer, the combination of a series of counters rotatably mounted on a common axis, a driver, a disconnectable clutch between said driver and the counter of lowest order, each counter of lower order having teeth arranged as a limited part of a gear and each counter of higher order having a continuous series of teeth, a carrying pinion intermediate said counters in mesh with said continuous series of teeth and arranged to be intermittently engaged by the teeth of the lower order counter, said pinion being otherwise clear of each counter and mounted immovably, except for rotation about its own axis, a yielding detent engaged with said pinion constructed and arranged to oppose yielding resistance only to rotation of the pinion in either direction, and direct transmission means between contiguous counters constructed to transmit motion positively from the lower order counter to the higher order counter when the former is turned backward and to yield inoperatively when the lower order counter is turned forward.

2. In an odometer, a series of counting disks mounted side by side upon the same axis, mechanism including a disconnectible clutch for rotating the right hand disk of the series in the forward direction, a carrying pinion parallel with the axis of said counters interposed between said right hand counter and the counter adjacent thereto, a mutilated gear carried by the right hand counter and a complete gear carried by said adjacent counter, both arranged to mesh with said carrying pinion for transmitting movement intermittently from the first counter to the second counter, a spring detent in a stationary position and bearing yieldingly upon said carrying pinion to resist, without positively preventing, rotation thereof in either direction, the left hand counter disk being otherwise free to rotate independently of the right hand disk, a spring pawl carried by one of said disks and an abutment complemental thereto carried by the other disk, said abutment and pawl being arranged to slip past one another when the counters are driven forwardly and to abut positively one against the other when the right hand counter is turned reversely, whereby to transmit motion therefrom in equal ratio to the left hand counter, the carrying pinion then slipping past its detent.

3. In an odometer as set forth in claim 2, a stationary bearing member on which said left hand disk is supported, the aforesaid detent member being constructed as a curved spring member having legs which embrace said bearing member and are formed as detents to enter between the teeth of the carrying pinion, and so shaped as to be displaced by the pressure of said teeth when sufficient rotating force is impressed upon the carrying pinion.

4. In a resetting odometer, a series of axially alined counter disks, stationary bearing means on which said disks are mounted, said bearing means including a sleeve passing through the hub of one of said counter disks, a stationary pinion holder mounted upon said bearing sleeve between two disks and having bearings at one side of said sleeve spaced apart to admit a pinion, a carrying pinion mounted in said bearings with its axis parallel to the axis of said counting disks and being so held by the holder that it is prevented from moving otherwise than rotatably upon its own axis, a spring detent formed to straddle said sleeve and having legs which are offset inwardly to form pawls entering between the teeth of said carrying pinion and bearing yieldingly thereon, being so spaced as to be displaced by rotation of the pinion under superior force, a mutilated gear on one of said counting disks arranged to engage one portion of the carrying pinion and a complete gear carried by the other of said counting disks arranged to engage another part of the carrying pinion.

5. An odometer comprising counter disks mounted side by side on the same axis, means for restraining all of said disks against axial movement away from one another, said disks being recessed within their circumferences, carrying mechanism located between adjacent disks in their recessed portions and including a mutilated gear on the disk of lower order, a complete gear on the disk of higher order, a pinion in mesh with said complete gear and arranged for intermittent engagement by said mutilated gear and a yielding detent engaging said pinion and constructed to resist rotation thereof but adapted to yield and permit such rotation in either direction by superior force, and quick resetting means comprising a spring pawl mounted on one of the disks and a complemental abutment on the adjacent disk, said pawl and abutment being within the recessed portions of the disks and further distant from the axis of the disks than the carrier pinion, whereby they are adapted to pass the latter without interference, and being relatively arranged to engage positively when the disk of lower order is turned backward, but to yield inoperatively when the lower order disk is turned forward.

6. An odometer comprising a series of number disks arranged side by side on a common axis and recessed within their peripheries, means preventing axial separation of one disk from another, carrying mechanism for transferring motion intermittently from each disk of lower order to the adjacent disk of higher order when the former is turned forwardly, said mechanism including a pinion and a yielding detent constructed to permit rotation of the pinion in either direction against yielding resistance, positive transmission means between adjacent disks constructed to transmit motion positively from each lower order disk to the next higher order disk when the former is turned backwardly, and being constructed to yield and permit independent forward movement of the lower order disk, driving means for the disks of lowest order including a disconnectible clutch, and means for disconnecting said clutch.

7. An odometer comprising an axially alined and rotatable series of counter disks, a stationary bearing sleeve on which the disk of higher order is rotatably mounted, said disks being recessed in their sides opposite to one another and within their peripheries, a pinion holder secured to said sleeve within the recesses of the disks, a transfer pinion mounted on the holder and projecting partly into the recess of each disk, a multilated gear carried by the central part of the disk of lower order arranged to engage said pinion intermittently, a complete gear carried by the central part of the disk of higher order in continuous mesh with said pinion, a yielding detent carried by the sleeve and engaging said pinion to resist rotation thereof, but being constructed to permit such rotation in either direction by superior force, a direct transfer means for quick resetting comprising an abutment on one of the disks and a yielding pawl on the other, complementally arranged to engage positively when the disk of lower order is turned backward and to yield inoperatively when the same disk is turned forward, and being located so near the periphery of the disks as to pass said pinion without interference a mechanically operated driving shaft, driving means between said shaft and the disk of lowest order comprising complemental clutch members, one of which is connected non-rotatably to the shaft and the other is connected non-rotatably to the said disk of lowest order, and one of said clutch members being axially displaceable to be disengaged from the other, and means for so moving said axially displaceable clutch member.

In testimony whereof I have affixed my signature.

GEORGE W. TONEY.